(12) United States Patent
Kobayashi

(10) Patent No.: US 10,458,509 B2
(45) Date of Patent: Oct. 29, 2019

(54) DAMPING VALVE AND SHOCK ABSORBER

(71) Applicant: KYB Corporation, Tokyo (JP)

(72) Inventor: Yoshifumi Kobayashi, Aichi (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/759,432

(22) PCT Filed: Sep. 8, 2016

(86) PCT No.: PCT/JP2016/076490
§ 371 (c)(1),
(2) Date: Mar. 12, 2018

(87) PCT Pub. No.: WO2017/047499
PCT Pub. Date: Mar. 23, 2017

(65) Prior Publication Data
US 2018/0259031 A1    Sep. 13, 2018

(30) Foreign Application Priority Data

Sep. 14, 2015  (JP) .................................. 2015-180349

(51) Int. Cl.
*F16F 9/46* (2006.01)
*F16F 9/348* (2006.01)
*F16K 17/06* (2006.01)

(52) U.S. Cl.
CPC ............ *F16F 9/464* (2013.01); *F16F 9/3488* (2013.01); *F16F 9/465* (2013.01); *F16K 17/06* (2013.01); *F16F 2230/24* (2013.01)

(58) Field of Classification Search
CPC ............ F16F 9/464; F16F 9/465; F16F 9/3488
See application file for complete search history.

(56) References Cited

U.S. PATENT DOCUMENTS 9,151,354 B2 * 10/2015 Ewers ..................... F16F 9/464
9,353,822 B2 *  5/2016 Yamasaki ............... F16F 9/325
2012/0305349 A1  12/2012 Murakami et al.

FOREIGN PATENT DOCUMENTS

JP      2013-11342 A    1/2013
JP      2014-173714 A   9/2014

* cited by examiner

*Primary Examiner* — Thomas J Williams
(74) *Attorney, Agent, or Firm* — Rabin & Berdo, P.C.

(57) ABSTRACT

A damping valve includes a valve element member, a disc spring, and a solenoid. The valve element member opens and closes an upstream side and a downstream side of a pilot passage by a pressure control valve element seated on and liftable from a pressure control valve seat and an open/close valve element seated on and liftable from an open/close valve seat. The disc spring is interposed between a stepped part and the valve element member. The disc spring biases the valve element member in a direction in which the pressure control valve element separates from the pressure control valve seat and in which the open/close valve element approaches the open/close valve seat. The solenoid is configured to drive the valve element member against a biasing force by the disc spring. In a state in which the disc spring has a natural length, a clearance is formed between the open/close valve element and the open/close valve seat.

7 Claims, 10 Drawing Sheets

DAMPING VALVE AND SHOCK ABSORBER

TECHNICAL FIELD

The present invention relates to a damping valve and a shock absorber.

BACKGROUND ART

Conventionally, there has been known a damping valve that controls a damping force of a shock absorber interposed between a vehicle body and an axle shaft of a vehicle to be variable. For example, as illustrated in FIG. 9, a damping valve described in JP2014-173714A includes a port (not illustrated) through which fluid flows during extension and contraction of a shock absorber, a main valve (not illustrated), which opens and closes an outlet of the port, a pilot passage 180, which guides pressure on the upstream side of the port as back-pressure of the main valve, a fail passage 190, which branches from the middle of the pilot passage 180, a pilot valve element 600, which is disposed in the middle of the pilot passage 180 and includes a seating portion 601 to open and close the upstream side with respect to a branching part 191 of the fail passage 190 in the pilot passage 180 and an annular projection 602 to open and close the downstream side with respect to the branching part 191 in the pilot passage 180, a coil spring 610, which biases the pilot valve element 600 in a direction of opening the upstream side with respect to the branching part 191 and closing the downstream side in the pilot passage 180, a solenoid S, which provides thrust to the pilot valve element 600 in a direction against biasing force from the coil spring 610, and a fail valve 192 disposed at the fail passage 190.

The damping valve with the configuration adjusts an energization amount to the solenoid S to adjust the thrust provided to the pilot valve element 600, thus controlling the back-pressure of the main valve. Additionally, changing a valve opening pressure of the main valve ensures controlling a damping force of the shock absorber variable. Additionally, during a fail during which a current supply to the solenoid S is cut off, the pilot valve element 600 receives the biasing force from the coil spring 610 and closes the downstream side with respect to the branching part 191 in the pilot passage 180. However, an increase in pressure of fluid inside the pilot passage 180 opens the fail valve 192; therefore, the fluid flows through the fail passage 190. Accordingly, by changing the valve opening pressure of the fail valve 192, the valve opening pressure of the main valve during the fail is set, thus any damping force characteristics generated in the shock absorber during the fail can be set.

SUMMARY OF INVENTION

When a piston speed of a shock absorber is a very low speed, to improve a ride comfort of a vehicle, a damping force of the shock absorber is set to the minimum (a full-soft control). For the full-soft control, an initial clearance needs to be formed between the seating portion 601 of the pilot valve element 600 and a pilot valve seat 501 on which the seating portion 601 is seated and from which the seating portion 601 is liftable such that the pilot passage 180 is controlled so as not to be cut off by the seating portion 601.

However, with the conventional damping valve, even during the full-soft control, there is a possibility that the seating portion 601 is seated on the pilot valve seat 501 and the initial clearance is not formed due to a variation in each product. This is because, although an amount of opening of the initial gap is determined by a balance between a thrust from a solenoid S and a biasing force from the coil spring 610, even when the amount of current supplied to the solenoid S during the full-soft control is adjusted to reduce the thrust from the solenoid S, the seating portion 601 is seated on the pilot valve seat 501 in some cases due to, for example, a dimensional tolerance of a component, a variation in the biasing force from the coil spring 610, and a variation in the amount of current supplied to the solenoid S.

Accommodating these variations, it is considered to increase the biasing force from the coil spring 610 such that the initial clearance is formed. Here, assume that the downstream side of the branching part 191 of the fail passage 190 in the pilot passage 180 as a pilot passage downstream portion 181. The pilot valve element 600 causes the annular projection 602 to be seated on an annular flange 502 disposed at a fail valve seat member 500 to cut off the communication of the pilot passage downstream portion 181. During the fail, with the conventional damping valve, the pilot valve element 600 is pressed to the flange 502 by the biasing force from the coil spring 610 to cut off the communication of the pilot passage downstream portion 181. Accordingly, in the case where the biasing force from the coil spring 610 is increased, in the full-soft control where the thrust from the solenoid S is small, the biasing force from the coil spring 610 is large relative to the thrust from the solenoid S. Therefore, when the pilot valve element 600 retreats receiving the pressure on the upstream side, the pilot valve element 600 retreats until the annular projection 602 contacts the flange 502. Thus, increasing the biasing force from the coil spring 610 configures damping force characteristics of the shock absorber in the full-soft control identical to the damping force characteristics during the fail, possibly obtaining desired damping force characteristics becomes difficult.

That is, it is difficult for the conventional damping valve to achieve both of forming the initial clearance between the seating portion 601 and the pilot valve seat 501 and preventing shutting off the communication of the pilot passage downstream portion 181 during the full-soft control.

An object of the present invention is to provide a damping valve and a shock absorber that ensure achieving both of preventing shutting off a flow passage by a pressure control valve element and preventing shutting off the flow passage by an open/close valve element during a full-soft control.

According to one aspect of the present invention, a damping valve is provided. The damping valve includes: a valve element member configured to include a pressure control valve element and an open/close valve element, the pressure control valve element being seated on and liftable from a pressure control valve seat to open and close a flow passage, the open/close valve element being seated on and liftable from an open/close valve seat to open and close a downstream side of the flow passage with respect to a part opened and closed by the pressure control valve element; an elastic member interposed between a spring receiver and the valve element member, the elastic member being configured to bias the valve element member in a direction in which the pressure control valve element separates from the pressure control valve seat and in which the open/close valve element approaches the open/close valve seat; and a solenoid configured to be capable of driving the valve element member against a biasing force by the elastic member in a direction in which the pressure control valve element approaches the pressure control valve seat. In a state in which the elastic member has a natural length, a clearance is formed between the open/close valve element and the open/close valve seat.

DESCRIPTION OF EMBODIMENTS

Figure 1:
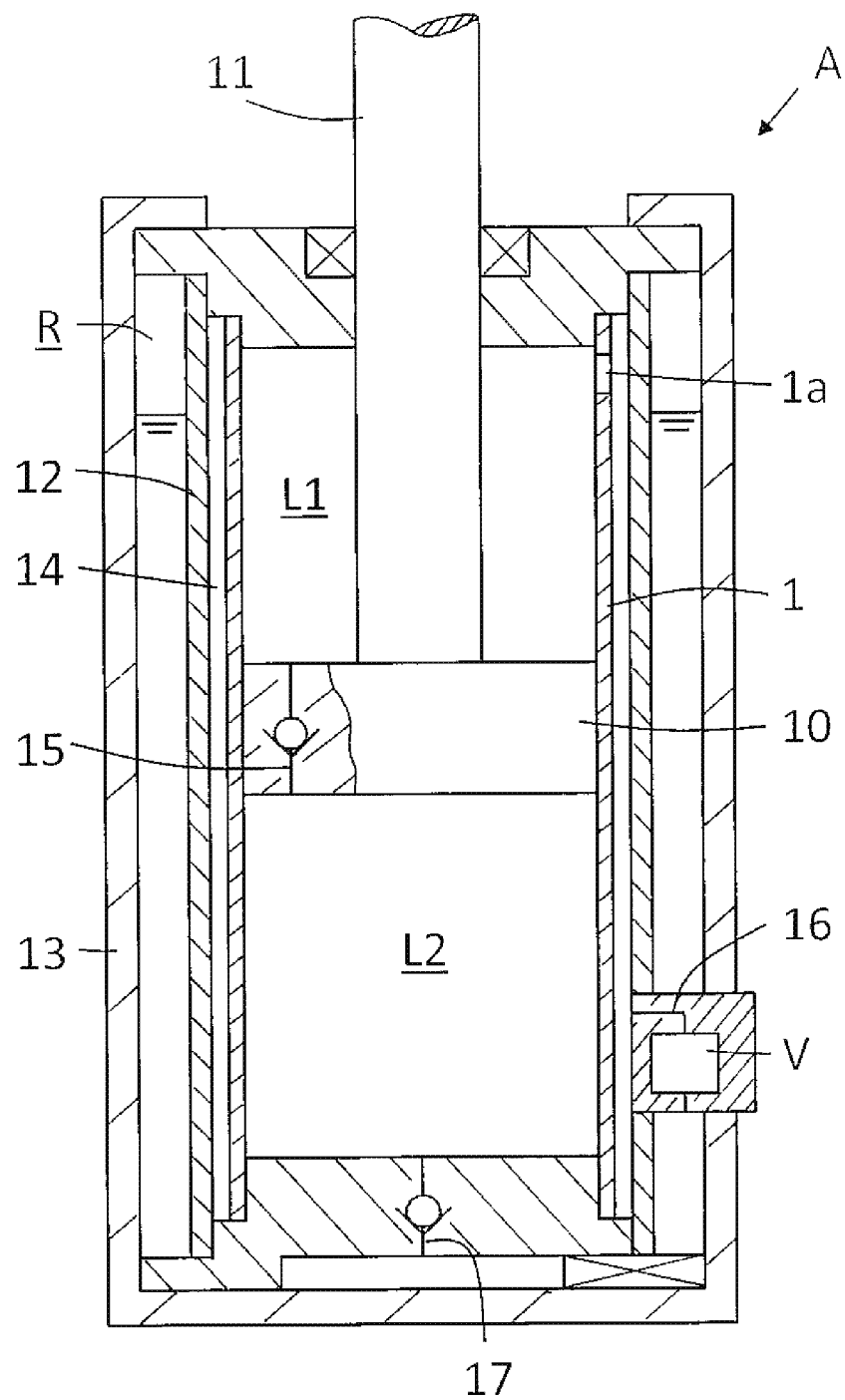
FIG. 1 is a vertical cross-sectional view conceptually illustrating a shock absorber that includes a damping valve according to an embodiment of the present invention.

The following describes an embodiment of the present invention with reference to the drawings. Like reference numerals designate identical or corresponding components throughout some drawings. The up, down, right, and left in the drawings are based on directions of signs in the drawings.

As illustrated in FIG. 1, a damping valve V according to the embodiment of the present invention is disposed at a shock absorber A interposed between a vehicle body and an axle shaft of a vehicle. The shock absorber A has a triple pipe structure including a cylinder 1, a piston 10 slidably inserted into the cylinder 1, a rod 11 having one end coupled to the piston 10 and the other end extending to the outside of the cylinder 1, an intermediate pipe 12 covering the outer periphery of the cylinder 1, and an outer pipe 13 covering the outer periphery of the intermediate pipe 12.

The inside of the cylinder 1 is partitioned into two chambers, a rod-side chamber L1 on the rod 11 side and a piston-side chamber L2 on the piston 10 side by the piston 10. The rod-side chamber L1 and the piston-side chamber L2 are filled with fluid such as hydraulic oil. Additionally, a tubular space between the cylinder 1 and the intermediate pipe 12 is an exhaust passage 14 filled with fluid. A tubular space between the intermediate pipe 12 and the outer pipe 13 is a reservoir R filled with fluid and gas. The rod-side chamber L1 is communicated with the piston-side chamber L2 through a piston passage 15 disposed at the piston 10. The piston passage 15 allows only a flow of fluid heading from the piston-side chamber L2 to the rod-side chamber L1. The rod-side chamber L1 communicates with the exhaust passage 14 through a communication hole 1a disposed on the cylinder 1. The exhaust passage 14 communicates with the reservoir R through a damping passage 16, and the damping valve V to provide a resistance to the flow of the fluid is disposed in the middle of the damping passage 16. The reservoir R communicates with the piston-side chamber L2 through a suction passage 17. The suction passage 17 allows only the flow of the fluid heading from the reservoir R to the piston-side chamber L2.

With the shock absorber A with the configuration, when the rod 11 enters into the cylinder 1 and the shock absorber A performs a contraction operation, the piston 10 moves downward in FIG. 1 to compress the piston-side chamber L2, and the fluid in the piston-side chamber L2 moves to the rod-side chamber L1 through the piston passage 15. During the contraction operation, the fluid by the volume of the rod entering the cylinder 1 becomes excess in the cylinder 1. This excess fluid passes through the communication hole 1a, the exhaust passage 14, and the damping passage 16 in this order and then is discharged from the rod-side chamber L1 to the reservoir R. Then, the damping valve V provides the resistance to the flow of the fluid passing through the damping passage 16, and the increase in pressure in the cylinder 1 generates a contraction-side damping force in the shock absorber A.

On the other hand, when the rod 11 exits from the cylinder 1 and the shock absorber A performs an extension operation, the piston 10 moves upward in FIG. 1 to compress the rod-side chamber L1, and the fluid in the rod-side chamber L1 passes through the communication hole 1a, the exhaust passage 14, and the damping passage 16 in this order to move to the reservoir R. During the extension operation, the piston 10 moves upward in FIG. 1, enlarging the capacity of the piston-side chamber L2. In view of this, the fluid by the enlarged capacity of the piston-side chamber L2 passes through the suction passage 17 and moves from the reservoir R to the piston-side chamber L2. Then, the damping valve V provides the resistance to the flow of the fluid passing through the damping passage 16, and the increase in pressure inside the cylinder 1 generates an extension-side damping force in the shock absorber A.

That is, the extension and contraction of the shock absorber A causes the fluid to circulate the piston-side chamber L2, the rod-side chamber L1, and the reservoir R in this order in one-way. Then, in both cases of the shock absorber A performing any operations of the compression operation and the extension operation, the fluid passes through the damping passage 16 and moves from the inside of the cylinder 1 to the reservoir R. Accordingly, disposing the one damping valve V providing the resistance to the fluid flowing through the damping passage 16 allows the shock absorber A to generate the extension-side damping force and the contraction-side damping force.

Figure 2:
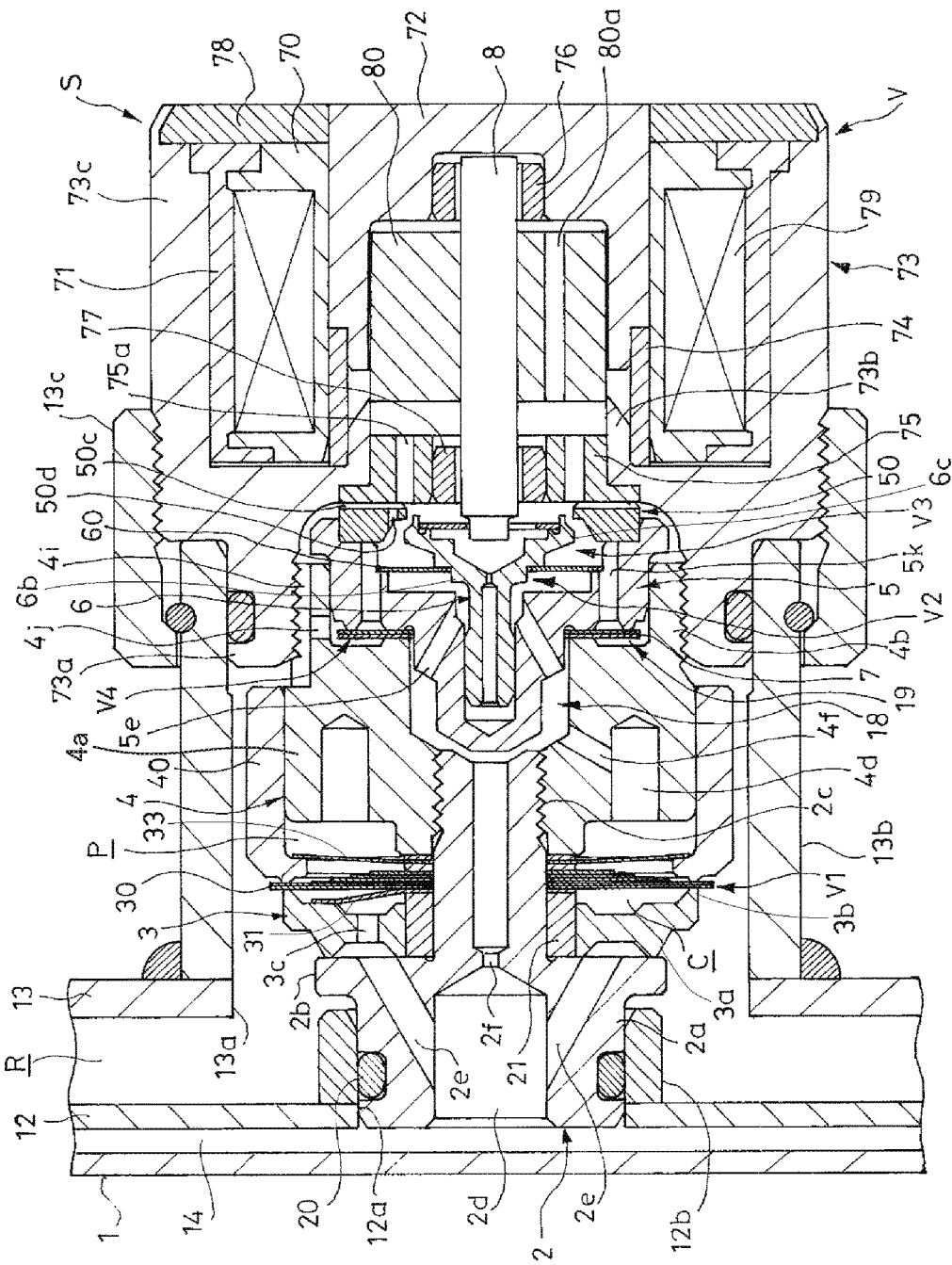
FIG. 2 is a vertical cross-sectional view illustrating the damping valve according to the embodiment of the present invention.

As illustrated in FIG. 2, the damping valve V is mounted to sleeves 12b and 13b disposed at horizontal holes 12a and 13a formed on the intermediate pipe 12 and the outer pipe 13. Specifically, the sleeve 12b projecting radially outside from the intermediate pipe 12 is fixed to the edge of the horizontal hole 12a disposed at the intermediate pipe 12. The sleeve 13b projecting radially outside from the outer pipe 13 is fixed to the edge of the horizontal hole 13a disposed at the outer pipe 13. These sleeves 12b and 13b have a tubular shape and are coaxially disposed. The inner diameter of the sleeve 13b disposed at the outer pipe 13 is larger than the outer diameter of the sleeve 12b disposed at the intermediate pipe 12. In view of this, the left end opening of the sleeve 12b in FIG. 2 is opposed to the exhaust passage 14, and the right end opening in FIG. 2 is positioned at the inside of the sleeve 13b. Additionally, the sleeve 12b is positioned at the center of the left end opening of the sleeve 13b in FIG. 2, and the outer peripheral side of the left end opening in FIG. 2 is opposed to the reservoir R. Furthermore, the right end opening of the sleeve 13b in FIG. 2 is covered with a solenoid S, which will be described later, of the damping valve V. The fluid in the exhaust passage 14 passes through the horizontal hole 12a and the inside of the sleeve 12b, is guided to the inside of the sleeve 13b, passes through the inside of the sleeve 13b and the horizontal hole 13a, and then is guided to the reservoir R. That is, the damping passage 16 (FIG. 1) is configured by these horizontal holes 12a and 13a and the sleeves 12b and 13b.

The damping valve V includes a mounting member 2, a main valve element 3 and an auxiliary valve element 30, a valve housing 4, a spool 40, a first valve seat member 5, a second valve seat member 50, a valve element member 6, a disc spring 60, the solenoid S, and a fail valve element 7. The mounting member 2 is fitted to the sleeve 12b and extends to the inside of the sleeve 13b. The main valve element 3 and the auxiliary valve element 30 are mounted to the outer periphery of the mounting member 2 projecting from the sleeve 12b. The valve housing 4 is coupled to the distal end portion of the mounting member 2. The spool 40 is slidably mounted to the outer periphery of the valve housing 4. The first valve seat member 5 is housed in the valve housing 4. The second valve seat member 50 is laminated on the first valve seat member 5. The valve element member 6 is seated on and liftable from the first valve seat member 5 and the second valve seat member 50. The disc spring 60 biases the valve element member 6 rightward in FIG. 2. The solenoid S drives the valve element member 6 leftward in FIG. 2. The fail valve element 7 is disposed between the valve housing 4 and the first valve seat member 5.

The mounting member 2 includes an inserted portion 2a fitted to the inner periptery of the sleeve 12b, a valve seat portion 2b continuous with the right side of the inserted portion 2a in FIG. 2 and having an outer diameter larger than the outer diameter of the inserted portion 2a, and a mounting shaft 2c extending rightward in FIG. 2 from the center portion of the valve seat portion 2b. At the mounting member 2, a shaft hole 2d, which axially penetrates the center portion of the mounting member 2, and a plurality of ports 2e, which have one ends opening to the shaft hole 2d and the other ends opening to the right end of the valve seat portion 2b in FIG. 2 and the outer peripheral side of the mounting shaft 2c, are formed. In the middle of the shaft hole 2d, an orifice 2f with a small flow passage cross-sectional area is disposed, and ports 2e communicate with the shaft hole 2d leftward with respect to the orifice 2f in FIG. 2.

An annular O-ring 20 is disposed between the inserted portion 2a and the sleeve 12b. Since the O-ring 20 covers between the inserted portion 2a and the sleeve 12b, the fluid flowing from the exhaust passage 14 into the sleeve 12b passes through the shaft hole 2d, moves to the inside of the sleeve 13b, and then moves to the reservoir R. A thread groove screwed with the valve housing 4 is formed on the outer periphery at the distal end portion of the mounting shaft 2c. A spacer 21 disposed at the outer periphery of the mounting shaft 2c is sandwiched to be fixed between the valve seat portion 2b and the valve housing 4. The circular plate-shaped main valve element 3 is slidably mounted to the outer periphery of the spacer 21.

Figure 3:
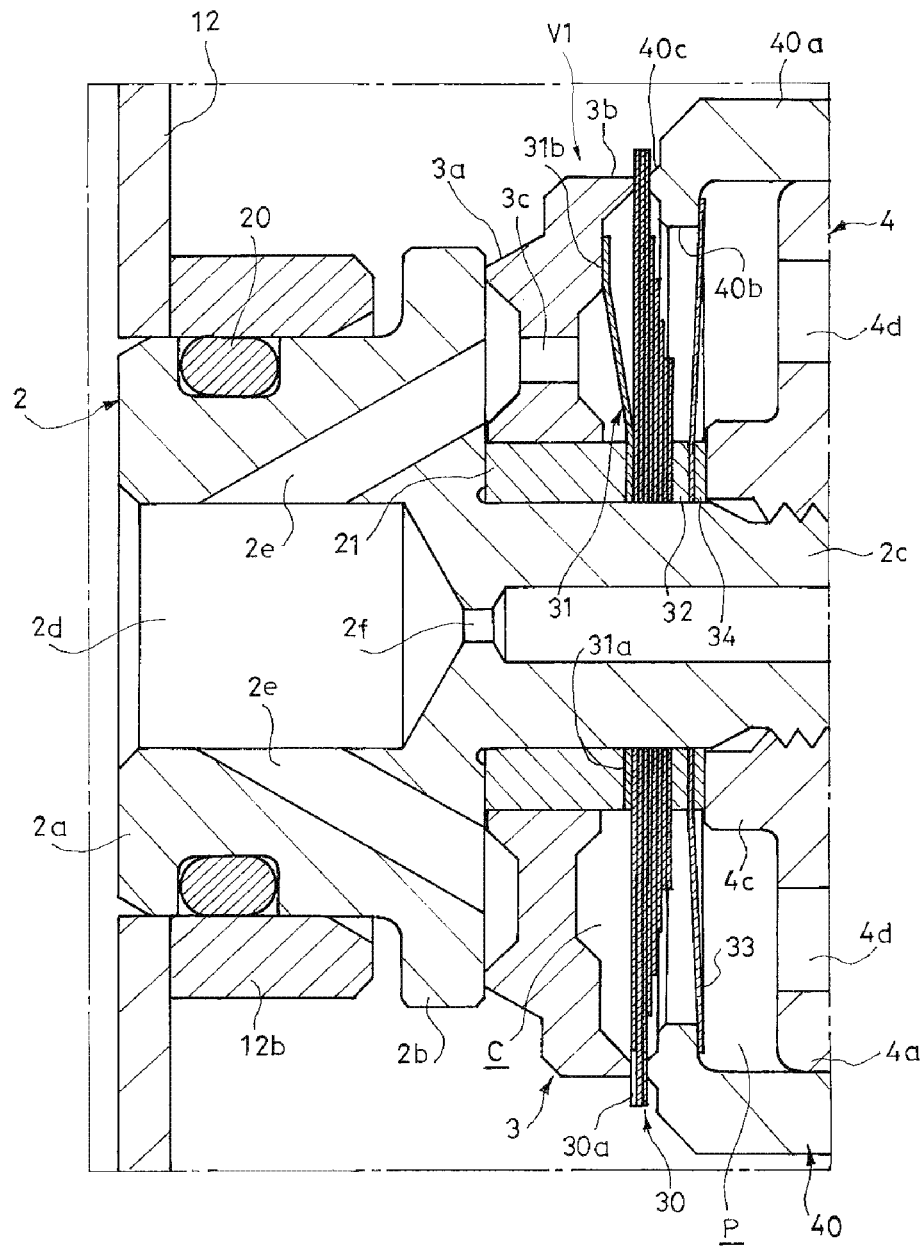
FIG. 3 is an enlarged view illustrating a part of FIG. 2.

As illustrated in FIG. 3, the main valve element 3 is an annular member on which a mounting hole to allow the spacer 21 to be inserted through is formed at the center. The main valve element 3 includes an annular projection 3a, which is disposed at the outer peripheral portion of the main valve element 3 and projects leftward in FIG. 3, an annular valve seat 3b, which is disposed at the outer peripheral portion of the main valve element 3 and projects rightward in FIG. 3, and a restricting passage 3c, which has one end opening to the inner peripheral side of the annular projection 3a and the other end opening to the inner peripheral side of the valve seat 3b and axially penetrates the main valve element 3. Since the annular projection 3a is seated on and liftable from the outer peripheral side with respect to the openings of the ports 2e of the valve seat portion 2b, the restricting passage 3c always communicates with the ports 2e. The axial length of the inner peripheral portion of the main valve element 3 is configured shorter than the axial length of the spacer 21. In view of this, the main valve element 3 is movable in the axial direction of the spacer 21.

The auxiliary valve element 30 is laminated rightward on the main valve element 3 in FIG. 3. The auxiliary valve element 30 is a laminated leaf valve formed by laminating a plurality of leaf valves, and a mounting hole to allow the mounting shaft 2c to be inserted through is disposed at the center. Additionally, the inner peripheral side of the auxiliary valve element 30 is sandwiched between the spacer 21 and the valve housing 4 to be fixed with a flexure on the outer peripheral side allowed. The outer peripheral portion of the auxiliary valve element 30 can be seated on and liftable from the valve seat 3b. On the inner peripheral side with respect to the valve seat 3b and between the main valve element 3 and the auxiliary valve element 30, an annular defined chamber C is formed. As described above, since the restricting passage 3c disposed at the main valve element 3 opens to the inner peripheral side of the valve seat 3b, the defined chamber C always communicates with the ports 2e through the restricting passage 3c. Furthermore, among the leaf valves constituting the auxiliary valve element 30, a cutout 30a functioning as an orifice is disposed on the outer periphery of the leaf valve on the main valve element 3 side most. It should be noted that the cutout 30a (the orifice) may be omitted.

A disc spring 31 biasing the main valve element 3 to the valve seat portion 2b side is interposed between the main valve element 3 and the auxiliary valve element 30. The disc spring 31 includes a circular ring 31a sandwiched between the spacer 21 and the valve housing 4 to be fixed, and a plurality of arms 31b radially extending from the outer periphery of the circular ring 31a and circumferentially arranged to function as springs. Since a clearance is disposed between the arm 31b and the arm 31b, the defined chamber C is not partitioned by the disc spring 31. Furthermore, on the right side of the auxiliary valve element 30 in FIG. 3, a distance piece 32, a disc spring 33, and a distance piece 34 are laminated in this order. The right end of the distance piece 34 in FIG. 3 is pressed by the valve housing 4.

Figure 4:
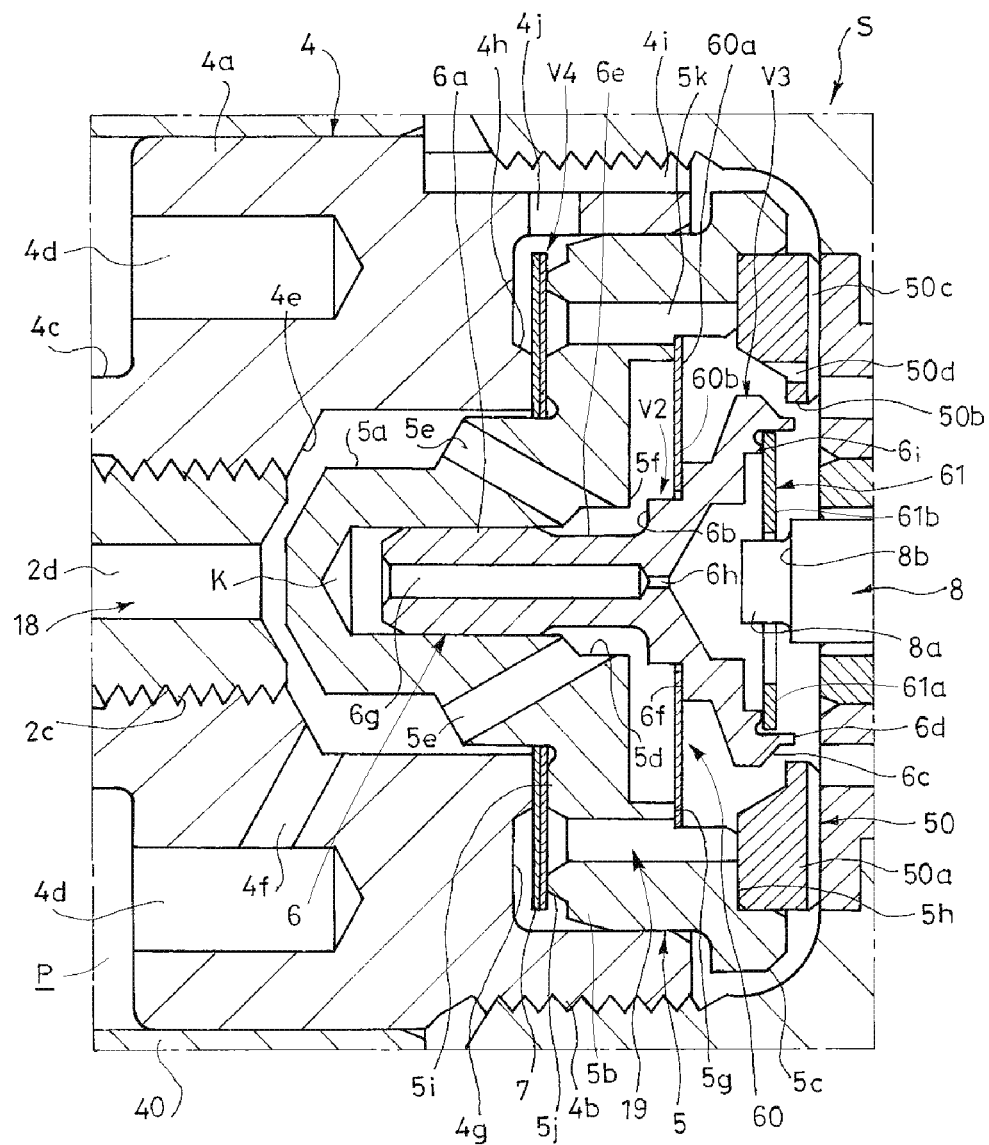
FIG. 4 is an enlarged view illustrating a part of FIG. 2 different from FIG. 3.

As illustrated in FIG. 4, the valve housing 4 is formed into a cylinder with a closed bottom. The valve housing 4 includes an annular bottom portion 4a, a tubular portion 4b, which stands rightward in FIG. 4 from the outer peripheral portion of the bottom portion 4a, and an annular projecting portion 4c, which projects leftward in FIG. 4 from the inner peripheral portion of the bottom portion 4a. Thread grooves are formed at respective inner periptery of the bottom portion 4a and the outer periphery of the tubular portion 4b. The mounting shaft 2c of the mounting member 2 inserted into the projecting portion 4c is screwed with the inner periptery of the bottom portion 4a. The solenoid S is screwed with the outer periphery of the tubular portion 4b. A plurality of insertion holes 4d for industrial tools opening to leftward in FIG. 4 are disposed at the bottom portion 4a. The insertion holes 4d are used to, for example, screw the valve housing 4 with the solenoid S. Furthermore, at the bottom portion 4a, a cone-shaped depressed portion 4e is formed continuous with the inner periptery of the tubular portion 4b at the right side in FIG. 4. The bottom portion 4a has a communication hole 4f opening to the depressed portion 4e and the insertion holes 4d to communicate between the depressed portion 4e and the insertion holes 4d. The spool 40 is mounted to the outer periphery of the bottom portion 4a.

As illustrated in FIG. 3, the spool 40 includes a tubular sliding tubular portion 40a, which slidingly contacts the outer periphery of the bottom portion 4a, an annular flange 40b, which projects from the left end of the sliding tubular portion 40a in FIG. 3 to the inner peripheral side, and an annular projection 40c, which projects from the flange 40b leftward in FIG. 3. The outer peripheral portion of the disc spring 33 abuts on the right side surface of the flange 40b in FIG. 3, and the spool 40 is biased to the auxiliary valve element 30 side by the disc spring 33. Accordingly, the annular projection 40c disposed at the flange 40b is pressed to the outer periphery of the right side surface of the auxiliary valve element 30 in FIG. 3. A back-pressure chamber P is configured at a space inside the spool 40 and between the disc spring 33 and the valve housing 4. The back-pressure chamber P communicates with the inside of the valve housing 4 through the insertion holes 4d and the communication hole 4f (FIG. 4).

As illustrated in FIG. 2, the shaft hole 2d of the mounting member 2 is open to the inside of the valve housing 4. In view of this, the fluid on the upstream side of the ports 2e passes through the shaft hole 2d, the inside of the valve housing 4, the communication hole 4f, and the insertion holes 4d, and then is guided to the back-pressure chamber P. Since the orifice 2f is disposed in the middle of the shaft hole 2d, the fluid on the upstream side of the ports 2e is depressurized by the orifice 2f and is introduced to the back-pressure chamber P. The pressure of the fluid introduced to the back-pressure chamber P is, similar to the biasing force from the disc spring 33, acts in a direction of the auxiliary valve element 30 being pressed to the main valve element 3. In view of this, when the shock absorber A extends and contracts, the pressure inside the rod-side chamber L1 acts on the main valve element 3 through the ports 2e from the front surface side, and from the back surface side, internal pressure of the back-pressure chamber P via the auxiliary valve element 30 and the biasing forces from the disc spring 33 and the disc spring 31 act.

A force found by multiplying a cross-sectional area found by subtracting the outer diameter cross-sectional area of the distance piece 34 from the inner diameter cross-sectional area of the sliding tubular portion 40a of the spool 40 illustrated in FIG. 3 by the pressure in the back-pressure chamber P acts in the direction of pressing the auxiliary valve element 30 to the main valve element 3. The force found by multiplying the cross-sectional area found by subtracting the outer diameter cross-sectional area of the spacer 21 from the inner diameter cross-sectional area of the valve seat 3b by the pressure in the defined chamber C acts in the direction of the auxiliary valve element 30 lifting from the main valve element 3. A ratio of the valve opening pressure of the auxiliary valve element 30 to the pressure inside the back-pressure chamber P becomes an increased pressure ratio of the auxiliary valve element 30. Then, the pressure inside the rod-side chamber L1 increases the pressure inside the defined chamber C. When the force attempting to flex the outer periphery of the auxiliary valve element 30 rightward in FIG. 3 overcomes the internal pressure of the back-pressure chamber P and the biasing force from the disc spring 33, the auxiliary valve element 30 flexes and lifts from the valve seat 3b. Thus forming the clearance between the auxiliary valve element 30 and the valve seat 3b opens the ports 2e.

In this embodiment, the inner diameter of the valve seat 3b is configured larger than the inner diameter of the annular projection 3a. Thus, a difference is provided between a pressure-receiving area of the main valve element 3 receiving the pressure on the port 2e side and the pressure-receiving area of the main valve element 3 receiving the pressure on the defined chamber C side. When the pressure difference generated by the restricting passage 3c does not reach the valve opening pressure to lift the main valve element 3 from the valve seat portion 2b, the main valve element 3 is maintained in the state seated on the valve seat portion 2b by the annular projection 3a. On the other hand, while the auxiliary valve element 30 flexes and opens and the defined chamber C is opened, when the pressure difference generated at the restricting passage 3c reaches the valve opening pressure to lift the main valve element 3 from the valve seat portion 2b, the main valve element 3 also lifts from the valve seat portion 2b to open the ports 2e. Here, the increased pressure ratio of the auxiliary valve element 30 is configured smaller than the increased pressure ratio of the main valve element 3 as the ratio of the valve opening pressure of the main valve element 3 to the pressure in the defined chamber C. That is, the pressure in the rod-side chamber L1 when the auxiliary valve element 30 opens becomes lower than the pressure inside the rod-side chamber L1 when the main valve element 3 opens. In other words, the valve opening pressure of the auxiliary valve element 30 is set lower than the valve opening pressure of the main valve element 3. Thus, the ports 2e are opened in two stages, by the main valve element 3 and the auxiliary valve element 30. A main valve V1 is configured by these main valve element 3 and auxiliary valve element 30.

As illustrated in FIG. 4, the tubular portion 4b of the valve housing 4 internally houses the fail valve element 7 and the first valve seat member 5 in the order from the left side in FIG. 4. The second valve seat member 50 is laminated rightward of the first valve seat member 5 in FIG. 4. The valve element member 6 as a poppet valve can be seated on and lifted from the first valve seat member 5 and the second valve seat member 50. The valve element member 6 is biased rightward in FIG. 4 by the disc spring 60 supported by the first valve seat member 5 and is driven leftward in FIG. 4 by the solenoid S. The fail valve element 7 is a laminated leaf valve formed by laminating a plurality of leaf valves.

Specifically, the right side of the inner diameter of the tubular portion 4b of the valve housing 4 is formed larger than the left side in FIG. 4, and an annular stepped part 4g is formed at a boundary between parts at which the inner diameter changes. An annular projecting portion 4h projecting rightward in FIG. 4 is disposed at the inner peripheral portion of the stepped part 4g to support the first valve seat member 5. The tubular portion 4b includes a groove 4i, which is formed on the outer periphery and axially extends, and a communication hole 4j, which opens to the groove 4i to allow communication between the groove 4i and the inside of the tubular portion 4b. The communication hole 4j is arranged on the right side in FIG. 4 with respect to the stepped part 4g at the tubular portion 4b.

The first valve seat member 5 includes a small-diameter portion 5a in the shape of a cylinder with a closed bottom, which is inserted leftward in FIG. 4 with respect to the stepped part 4g at the tubular portion 4b and has the distal end portion inserted into the depressed portion 4e, an annular collar portion 5b, which projects out from the right end portion in FIG. 4, the opening side of the small-diameter portion 5a, to the outer peripheral side, and an annular supporting portion 5c, which projects from the outer peripheral portion of the collar portion 5b rightward in FIG. 4. The small-diameter portion 5a has an annular groove 5d, which is formed on the inner peripetry of the end portion on the opening side along the circumferential direction, and a plurality of communication holes 5e, which obliquely penetrate from the annular groove 5d to the side portion of the small-diameter portion 5a. An annular pressure control valve seat 5f is configured at the inner peripheral edge portion of the end surface on the opening side of the small-diameter portion 5a. A pressure control valve element 6b, which will be described later, of the valve element member 6 is seated on and liftable from the pressure control valve seat 5f.

The inner diameter of the supporting portion 5c of the first valve seat member 5 is enlarged in two stages to the right end in FIG. 4, and stepped parts 5g and 5h are disposed on respective boundaries between parts where the inner diameters change. In the order from the left side in FIG. 4, the stepped part 5g on the first stage supports the disc spring 60 as the spring receiver and the stepped part 5h on the second stage supports the second valve seat member 50.

The collar portion 5b includes an annular projection 5i, which projects from the inner peripheral portion of the collar portion 5b leftward in FIG. 4, an annular fail valve seat 5j, which projects from the outer peripheral portion of the collar portion 5b leftward in FIG. 4, and a communication hole 5k, which is formed penetrating from between the annular projection 5i and the fail valve seat 5j to the stepped part 5h. The communication hole 5k also opens to the inner peripheral side of the supporting portion 5c such that the right end in FIG. 4 is not covered with the second valve seat member 50. The inner peripheral side of the fail valve element 7 is sandwiched between the projecting portion 4h of the valve housing 4 and the annular projection 5i of the first valve seat member 5 to be fixed. The flexure on the outer peripheral side of the fail valve element 7 is allowed by the annular space formed at the outer periphery of the projecting portion 4h. The outer peripheral portion of the fail valve element 7 is seated on and liftable from the fail valve seat 5j to open and close the communication hole 5k.

The second valve seat member 50 includes an annular fitted portion 50a, which is fitted to the inner peripetry of the supporting portion 5c of the first valve seat member 5 and abuts on the stepped part 5h, an annular open/close valve seat 50b, which projects out from the fitted portion 50a to the inner peripheral side, a groove 50c, which radially extends from the inner peripheral end to the outer peripheral end on the right portion of the second valve seat member 50 in FIG. 4, and an orifice 50d, which opens to the groove 50c and communicates with the left side of the open/close valve seat 50b in FIG. 4. An open/close valve element 6c, which will be described later, of the valve element member 6 is seated on and liftable from the open/close valve seat 50b.

The valve element member 6 includes a slide shaft portion 6a, which is slidably inserted into the small-diameter portion 5a of the first valve seat member 5, the pressure control valve element 6b, which projects out from the right end of the slide shaft portion 6a, which projects from the small-diameter portion 5a, in FIG. 4 to the outer peripheral side, the open/close valve element 6c, which is continuous with the right of the pressure control valve element 6b in FIG. 4 and has an outer diameter larger than the outer diameter of the pressure control valve element 6b, and an annular socket 6d, which projects from the open/close valve element 6c rightward in FIG. 4. An annular groove 6e is formed along the circumferential direction on the outer periphery at the right end portion of the slide shaft portion 6a in FIG. 4. The annular groove 6e is formed so as to be always opposed to the communication holes 5e within a range in which the axial movement of the valve element member 6 with respect to the first valve seat member 5 and the second valve seat member 50 is allowed. In view of this, the valve element member 6 never obstructs the communication holes 5e. The disc spring 60 as an elastic member is mounted to the outer periphery of the pressure control valve element 6b.

Figure 5:
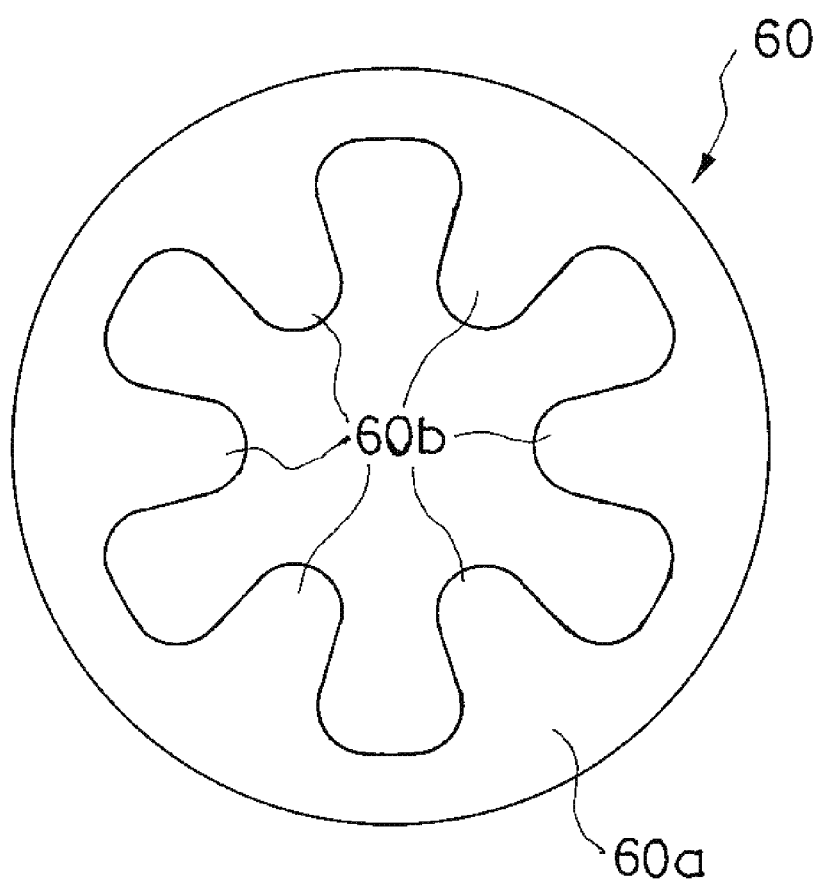
FIG. 5 is a plan view illustrating a disc spring (an elastic member) of the damping valve according to the embodiment of the present invention.

As illustrated in FIG. 5, the disc spring 60 includes an annular outer peripheral annular portion 60a and a plurality of tongue portions 60b, which project from the outer peripheral annular portion 60a to the center and are circumferentially arranged. These tongue portions 60b function as springs. As illustrated in FIG. 4, since the stepped part 5g of the first valve seat member 5 supports the outer peripheral annular portion 60a of the disc spring 60, the flexure of the tongue portions 60b to the left in FIG. 4 is allowed. At the outer periphery of the boundary part between the pressure control valve element 6b and the open/close valve element 6c, an annular stepped part 6f on which the tongue portions 60b abut is disposed. The pressure control valve element 6b penetrates the center portion of the disc spring 60.

Here, defining an axial length of the valve element member 6 from a part that the pressure control valve element 6b is seated on the pressure control valve seat 5f to a part that the open/close valve element 6c is seated on the open/close valve seat 50b as M and defining an axial distance from the pressure control valve seat 5f to the open/close valve seat 50b as N, M is configured to be shorter than N (M<N). In the case where the outer peripheral annular portion 60a abuts on the stepped part 5g of the first valve seat member 5 with the disc spring 60 having a natural length (the axial length of the disc spring 60 while a load is not applied) and the position of the valve element member 6 when the tongue portions 60b abut on the stepped part 6f of the valve element member 6 is defined as a neutral position, with the valve element member 6 at the neutral position, respective clearances are formed between the pressure control valve element 6b and the pressure control valve seat 5f and between the open/close valve element 6c and the open/close valve seat 50b.

In view of this, when the valve element member 6 moves forward from the neutral position leftward in FIG. 4 and the pressure control valve element 6b abuts (is seated) on the pressure control valve seat 5f, between the pressure control valve seat 5f and the pressure control valve element 6b is covered. Thus, with the valve element member 6 at the position moving forward with respect to the neutral position, the tongue portions 60b elastically deform to bias the valve element member 6 rightward in FIG. 4. On the contrary, when the valve element member 6 retreats from the neutral position rightward in FIG. 4 and the open/close valve element 6c abuts (is seated) on the open/close valve seat 50b, between the open/close valve seat 50b and the open/close valve element 6c is covered. With the valve element member 6 thus at the position retreating with respect to the neutral position, the disc spring 60 has the natural length similar to the case of the valve element member 6 at the neutral position. In view of this, in this state where, the biasing force by the disc spring 60 does not act on the valve element member 6.

A shaft hole 6g penetrating in the axial direction is disposed at the center portion of the valve element member 6. In the middle of the shaft hole 6g, an orifice 6h with a small flow passage cross-sectional area is disposed. A space K formed between the distal end of the slide shaft portion 6a and the bottom portion of the small-diameter portion 5a communicates with a space outside the valve element member 6 through the shaft hole 6g. Accordingly, when the valve element member 6 moves right and left in FIG. 4 with respect to the first valve seat member 5 and the second valve seat member 50, the space K functions as a dashpot and a steep displacement of the valve element member 6 is suppressed and also a vibration of the valve element member 6 can be suppressed.

Figure 6:
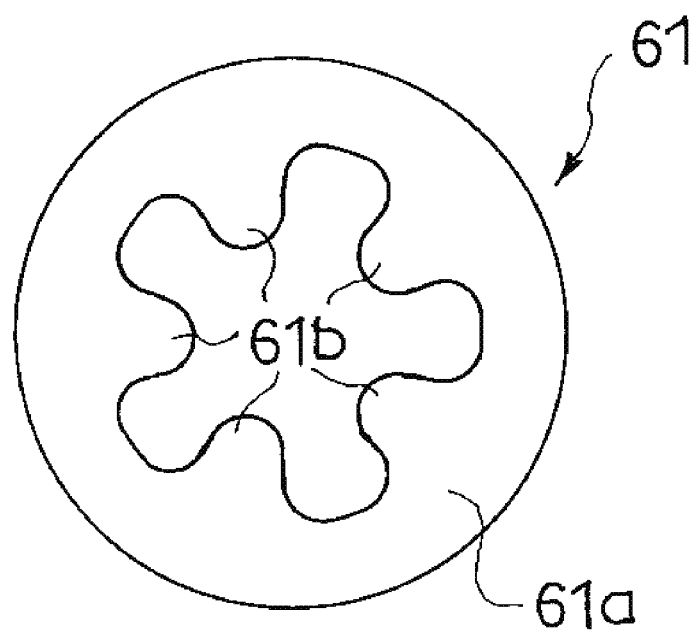
FIG. 6 is a plan view illustrating a disc spring (a second elastic member) of the damping valve according to the embodiment of the present invention.

A disc spring 61 as a second elastic member is loosely fitted to the inside of the socket 6d of the valve element member 6. The valve element member 6 receives the thrust from the solenoid S via the disc spring 61. As illustrated in FIG. 6, the disc spring 61 includes an annular outer peripheral annular portion 61a and a plurality of tongue portions 61b, which project from the outer peripheral annular portion 61a to the center and are circumferentially arranged. These tongue portions 61b function as springs. As illustrated in FIG. 4, a stepped part 6i is formed at the inner periphery of the socket 6d. Supporting the outer peripheral annular portion 61a of the disc spring 61 by the stepped part 6i allows the leftward flexure of the tongue portions 61b in FIG. 4. Into the center portion of the disc spring 61, a small-diameter portion 8a, which will be described later, disposed at the distal end portion of a shaft 8 of the solenoid S is loosely inserted. The tongue portions 61b of the disc spring 61 can abut on a stepped part 8b formed at the base end of the small-diameter portion 8a.

In view of this, when the shaft 8 moves forward leftward in FIG. 4, the stepped part 8b contacts the disc spring 61, and the disc spring 61 abuts on the stepped part 6i of the socket 6d, the thrust from the solenoid S is transmitted to the valve element member 6 via the disc spring 61. On the contrary, when the shaft 8 retreats rightward in FIG. 4 and the stepped part 8b is away from the disc spring 61, the disc spring 61 is in a state of freely axially movable with respect to the shaft 8. It should be noted that even if the disc spring 61 is in the state of axially movable with respect to the shaft 8, the disc spring 61 never comes off from the small-diameter portion 8a and the socket 6d. Specifically, with the valve element member 6 at the neutral position or the position moving forward with respect to the neutral position and the shaft 8 in the state of retreating to the maximum, the stepped part 8b of the shaft 8 is configured to be at the position axially identical to the opening end (the right end in FIG. 4) of the socket 6d or at the position left side with respect to the position in FIG. 4.

As illustrated in FIG. 2, the solenoid S includes a solenoid bobbin 70 around which a winding wire 79 is wound, a mold resin 71, which covers the peripheral area of the solenoid bobbin 70, a first stator iron core 72 in the shape of a cylinder with a closed bottom, which is fitted to the inner periphery on the one end side of the solenoid bobbin 70, a second stator iron core 73, which includes an annular fitted portion 73b fitted to the inner periphery on the other end side of the solenoid bobbin 70, a feeler ring 74 made of a non-magnetic material, which is fitted to the inner periphery of the solenoid bobbin 70 and forms a void between the first stator iron core 72 and the fitted portion 73b of the second stator iron core 73, a tubular movable iron core 80, which is inserted into the first stator iron core 72, the shaft 8, which is fixed to the inner periphery of the movable iron core 80, an annular guide 75, which is fitted to the inner periphery of the fitted portion 73b, and respective annular bushes 76 and 77, which are fitted to the top of the first stator iron core 72 and the inner periphery of the guide 75 to journal the shaft 8 so as to be axially movable. The movable iron core 80 has a through-hole 80a, which axially penetrates the movable iron core 80. Since chambers disposed at both sides of the movable iron core 80 in the axial direction communicate with one another through the through-hole 80a, the movable iron core 80 is axially and smoothly movable. Additionally, a through-hole 75a, which penetrates in the axial direction, is also disposed at the guide 75. This reduces a pressure difference between both sides of the guide 75 in the axial direction.

In the solenoid S, a magnetic path is formed passing through the first stator iron core 72, the movable iron core 80, and the second stator iron core 73. When the winding wire 79 is excited, the movable iron core 80 arranged close to the first stator iron core 72 is attracted to the fitted portion 73b side of the second stator iron core 73 and the thrust heading to the left in FIG. 2 acts on the movable iron core 80. In view of this, the shaft 8 moving integrally with the movable iron core 80 provides the valve element member 6 with the thrust in the direction heading to the left in FIG. 2 during the excitation of the solenoid S.

The second stator iron core 73 includes a cap portion 73a in the shape of a cylinder with a closed bottom, which is fitted to the inner periphery of the sleeve 13b disposed at the outer pipe 13, the annular fitted portion 73b, which stands from the inner peripheral portion at the annular top of the cap portion 73a rightward in FIG. 2 and is fitted to the inner periphery of the solenoid bobbin 70, and a tubular case 73c, which stands from the outer peripheral portion at the top of the cap portion 73a rightward in FIG. 2. The solenoid bobbin 70 with the winding wire 79 covered with the mold resin 71, the feeler ring 74, and the first stator iron core 72 are inserted into the case 73c, and then a lid 78 is covered and the distal end of the case 73c is swaged to the inner peripheral side, thus integrating these members. With the guide 75 of with the bush 77 fitted to the fitted portion 73b of the second stator iron core 73, the cap portion 73a is screwed with the outer periphery of the tubular portion 4b of the valve housing 4, and a nut 13c disposed at the outer periphery of the sleeve 13b is screwed with the outer periphery of the second stator iron core 73. Since the nut 13c is retained to the sleeve 13b, the second stator iron core 73 can be fixed to the sleeve 13b. The valve housing 4 screwed with the second stator iron core 73 and the mounting member 2 screwed with the valve housing 4 can be fixed to the sleeve 12b. Between the valve housing 4 and the second stator iron core 73, the fail valve element 7, the first valve seat member 5, the second valve seat member 50, and the guide 75 are sandwiched to be fixed. Between the cap portion 73a and the sleeve 13b, an annular O-ring (not indicated by reference numeral) is disposed. The O-ring prevents the fluid inside the sleeve 13b from leaking to the external air side.

Between the guide 75 and the second valve seat member 50, the groove 50c disposed at the second valve seat member 50 forms a clearance. Between the second stator iron core 73 and the tubular portion 4b, the groove 4i disposed at the tubular portion 4b forms a clearance. The first valve seat member 5 and the second stator iron core 73 are configured so as not to be in direct contact with one another. The shaft hole 2d of the mounting member 2, the inside of the valve housing 4, the communication holes 5e of the first valve seat member 5, the inside of the first valve seat member 5, the clearance formed between the guide 75 and the second valve seat member 50 by the groove 50c, the clearance formed between the first valve seat member 5 and the second stator iron core 73, and the clearance formed between the second stator iron core 73 and the valve housing 4 by the groove 4i configure a pilot passage 18 as a flow passage. The inside of the valve housing 4 in the pilot passage 18 communicates with the back-pressure chamber P through the communication hole 4f and the insertion holes 4d of the valve housing 4.

The pressure control valve element 6b of the valve element member 6 configures a pressure control valve V2 together with the disc spring 60 and the solenoid S. The pressure control valve element 6b is seated on and liftable from the pressure control valve seat 5f to open and close the pilot passage 18. With the valve element member 6 at the position moving forward with respect to the neutral position, since the disc spring 60 biases the valve element member 6 rightward in FIG. 2, the biasing force from the disc spring 60 acts in the direction of opening the pressure control valve V2. Additionally, the open/close valve element 6c of the valve element member 6 configures an open/close valve V3 together with the disc spring 60, and the open/close valve element 6c is seated on and liftable from the open/close valve seat 50b to open and close the downstream side with respect to the pressure control valve V2 in the pilot passage 18. That is, the damping valve V includes the pressure control valve V2 and the open/close valve V3 in series with the pressure control valve V2 on the upstream side in the middle of the pilot passage 18. In the damping valve V, the pressure control valve element 6b as the valve element of the pressure control valve V2 and the open/close valve element 6c as the valve element of the open/close valve V3 are integrated as the valve element member 6.

A fail passage 19 is configured by the communication hole 5k of the first valve seat member 5, the clearance formed between the valve housing 4 and the first valve seat member 5 and at the outer periphery of the projecting portion 4h, and the communication hole 4j. As described above, the communication hole 5k is disposed between the pressure control valve seat 5f and the open/close valve seat 50b and opens to the inner peripheral side of the supporting portion 5c. The communication hole 4j of the fail passage 19 communicates with the clearance formed between the second stator iron core 73 and the valve housing 4 by the groove 4i. That is, the fail passage 19 branches from between the pressure control valve V2 and the open/close valve V3 in the pilot passage 18 and joins to the pilot passage 18 bypassing the open/close valve V3. A fail valve V4 is constituted of the fail valve element 7 sandwiched between the first valve seat member 5 and the valve housing 4. The fail valve V4 causes the fail valve element 7 to be seated on and liftable from the fail valve seat 5j to open and close the fail passage 19.

The following describes the operations of the damping valve V with the configuration.

When the shock absorber A extends and contracts and the pressure inside the rod-side chamber L1 increases, this pressure acts on the main valve element 3 through the exhaust passage 14 and the ports 2e and acts on the auxiliary valve element 30 through the restricting passage 3c of the main valve element 3 and the defined chamber C. In the case where the piston speed is low and the main valve element 3 and the auxiliary valve element 30 do not open, the fluid passes through an orifice formed by the cutout 30a on the auxiliary valve element 30 and moves to the reservoir R.

Figure 7:
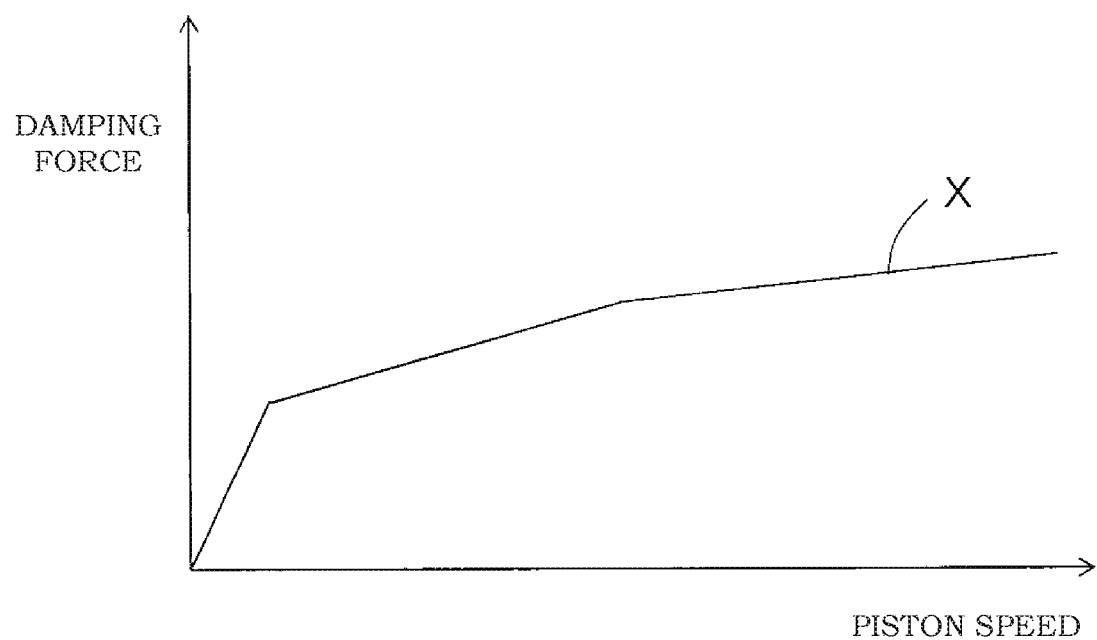
FIG. 7 is a drawing illustrating damping force characteristics of a shock absorber to which the damping valve according to the embodiment of the present invention is applied.

As described above, configuring the increased pressure ratio of the auxiliary valve element 30 to be smaller than the increased pressure ratio of the main valve element 3 configures the valve opening pressure of the auxiliary valve element 30 to be smaller than the valve opening pressure of the main valve element 3. In view of this, the increase in the piston speed first opens the auxiliary valve element 30 and then opens the main valve element 3. With only the auxiliary valve element 30 opened, the clearance is formed between the outer peripheral portion of the auxiliary valve element 30 flexed to the right in FIG. 2 and the valve seat 3b of the main valve element 3, and the fluid moves to the reservoir R through this clearance. Opening the main valve element 3 as well generates a clearance between the annular projection 3a of the main valve element 3 and the valve seat portion 2b. The fluid moves to the reservoir R through this clearance. Thus, in this embodiment, the main valve V1 opens the ports 2e in stages (the two stages), thereby increasing the flow passage area of the flow passage communicating between the ports 2e and the reservoir R in stages. Accordingly, as indicated by a solid line X in FIG. 7, damping force characteristics of the shock absorber A (the characteristics of the damping force to the piston speed) are characteristics where a damping coefficient (a gradient of the solid line X) decreases in stages as the increase in piston speed from the opening of the auxiliary valve element 30 and the main valve element 3.

The valve opening pressure to open the ports 2e by the auxiliary valve element 30 is adjustable by changing the internal pressure of the back-pressure chamber P acting on the back surface of the auxiliary valve element 30. The internal pressure of the back-pressure chamber P can be controlled by adjusting the energization amount to the solenoid S and adjusting the valve opening pressure of the pressure control valve V2. That is, changing the energization amount to the solenoid S can adjust the magnitude of the damping force generated by the shock absorber A.

Specifically, by supplying the current to the solenoid S to cause the thrust to act on the valve element member 6, the pressure control valve element 6b of the valve element member 6 is pressed to the pressure control valve seat 5f against the biasing force from the disc spring 60 and is seated on. In this state, when a resultant force of the force that the pressure in the rod-side chamber L1 acting on the valve element member 6 through the pilot passage 18 lifts the pressure control valve element 6b from the pressure control valve seat 5f and the biasing force from the disc spring 60 exceeds the thrust from the solenoid S, the pressure control valve V2 opens and the pilot passage 18 is opened. Thus, adjusting the magnitude of the amount of current supplied to the solenoid S and adjusting the thrust from the solenoid S ensures the adjustment of the valve opening pressure of the pressure control valve V2. Opening the pressure control valve V2 makes the pressure on the upstream side with respect to the pressure control valve V2 in the pilot passage 18 equal to the valve opening pressure of the pressure control valve V2. That is, the internal pressure of the back-pressure chamber P into which the pressure on the upstream side with respect to the pressure control valve V2 in the pilot passage 18 is introduced also becomes equal to the valve opening pressure of the pressure control valve V2. Lowering the internal pressure of the back-pressure chamber P also reduces the valve opening pressures of the auxiliary valve element 30 and the main valve element 3; therefore, the damping force can be decreased. On the other hand, increasing the internal pressure of the back-pressure chamber P also increases the valve opening pressures of the auxiliary valve element 30 and the main valve element 3, thereby ensuring increasing the damping force.

In this embodiment, the full-soft control to minimize the damping force does not close the pressure control valve V2 even at the piston speed of zero and is configured such that the initial clearance is formed between the pressure control valve seat 5$f$ and the pressure control valve element 6$b$. Accordingly, with the piston speed at an extremely low speed range, the fluid passes through the pressure control valve V2 at a comparatively free from the resistance; therefore, the internal pressure of the back-pressure chamber P can be lowered. Consequently, the damping force at the extremely low speed range can be decreased in the full-soft control.

Since the thrust from the solenoid S is small during the full-soft control, the valve element member 6 is likely to retreat (is likely to move rightward in FIG. 2). However, when the valve element member 6 reaches the neutral position, the disc spring 60 becomes the natural length, and even if the valve element member 6 retreats from the neutral position, the disc spring 60 still has the natural length; therefore, the valve element member 6 never receives the biasing force from the disc spring 60. That is, the valve element member 6 has a structure such that, while the valve element member 6 is movable from the position seated on the pressure control valve seat 5$f$ to the position seated on the open/close valve seat 50$b$, the biasing force from the disc spring 60 acts on the retreating valve element member 6 up to the halfway. Accordingly, even if the biasing force from disc spring 60 to bias the valve element member 6 rightward in FIG. 4 is increased by, for example, the use of the disc spring 60 with large spring constant, the biasing force from the disc spring 60 does not affect the valve element member 6 with the valve element member 6 seated on the open/close valve seat 50$b$. In view of this, even if the piston speed increases and the resultant force of the force that the pressure in the rod-side chamber L1 lifts the pressure control valve element 6$b$ from the pressure control valve seat 5$f$ and the biasing force from the disc spring 60 increases during the full-soft control, this configuration allows preventing the valve element member 6 from being seated on the open/close valve seat 50$b$ and the open/close valve V3 from obstructing the downstream side of the pressure control valve V2 in the pilot passage 18.

Figure 8A:
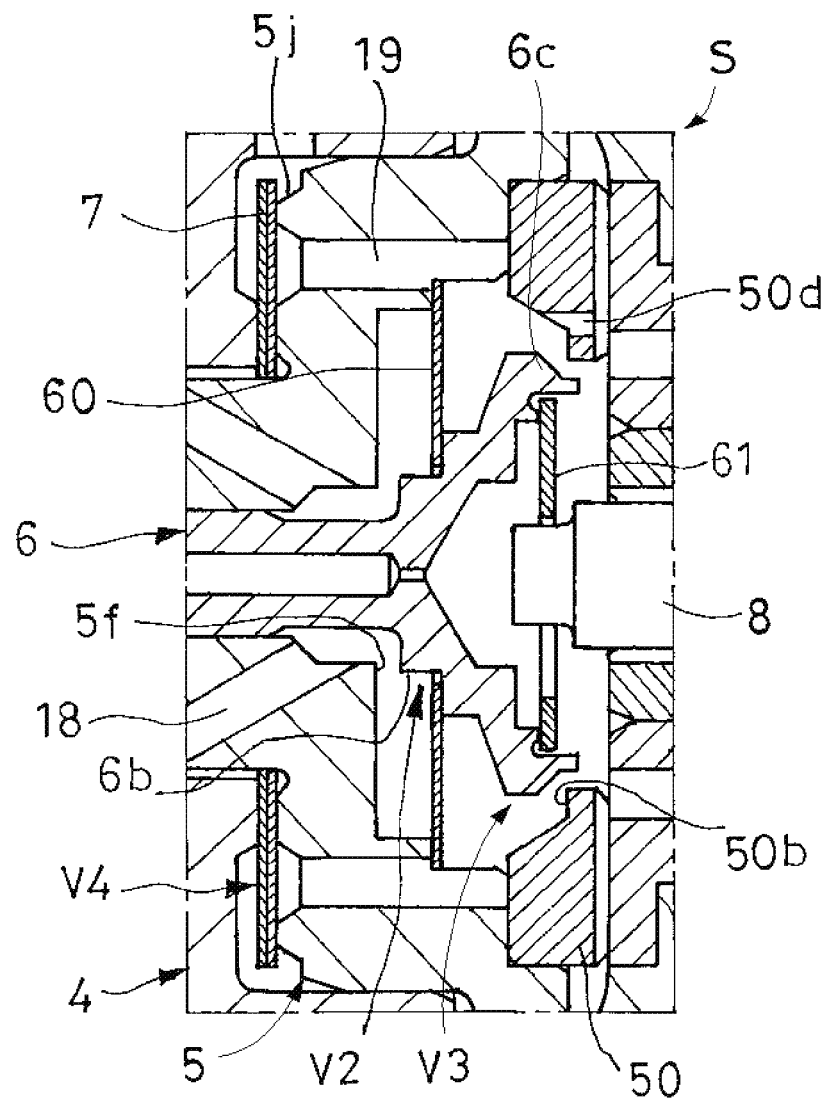
FIG. 8A is a partially enlarged vertical cross-sectional view illustrating a state where a valve element member of the damping valve according to the embodiment of the present invention is at a neutral position during a fail.

On the other hand, the thrust from the solenoid S is lost during the non-excitation of the solenoid S. In view of this, the biasing force from the disc spring 60 lifts the valve element member 6 from the pressure control valve seat 5$f$ and opens the pressure control valve V2. In the process in which the valve element member 6 moving forward with respect to the neutral position retreats to the neutral position, the valve element member 6 retreats receiving the biasing force from the disc spring 60. As illustrated in FIG. 8A, when the valve element member 6 reaches the neutral position, the disc spring 60 has the natural length. In the case where the piston speed is at the extremely low speed range and the flow rate of the fluid flowing through the pilot passage 18 is small, the valve element member 6 does not retreat up to the position where the valve element member 6 is seated on the open/close valve seat 50$b$. Accordingly, the fluid passes through the clearance formed between the open/close valve element 6$c$ and the open/close valve seat 50$b$ and the orifice 50$d$ to move to the reservoir R.

Figure 8B:
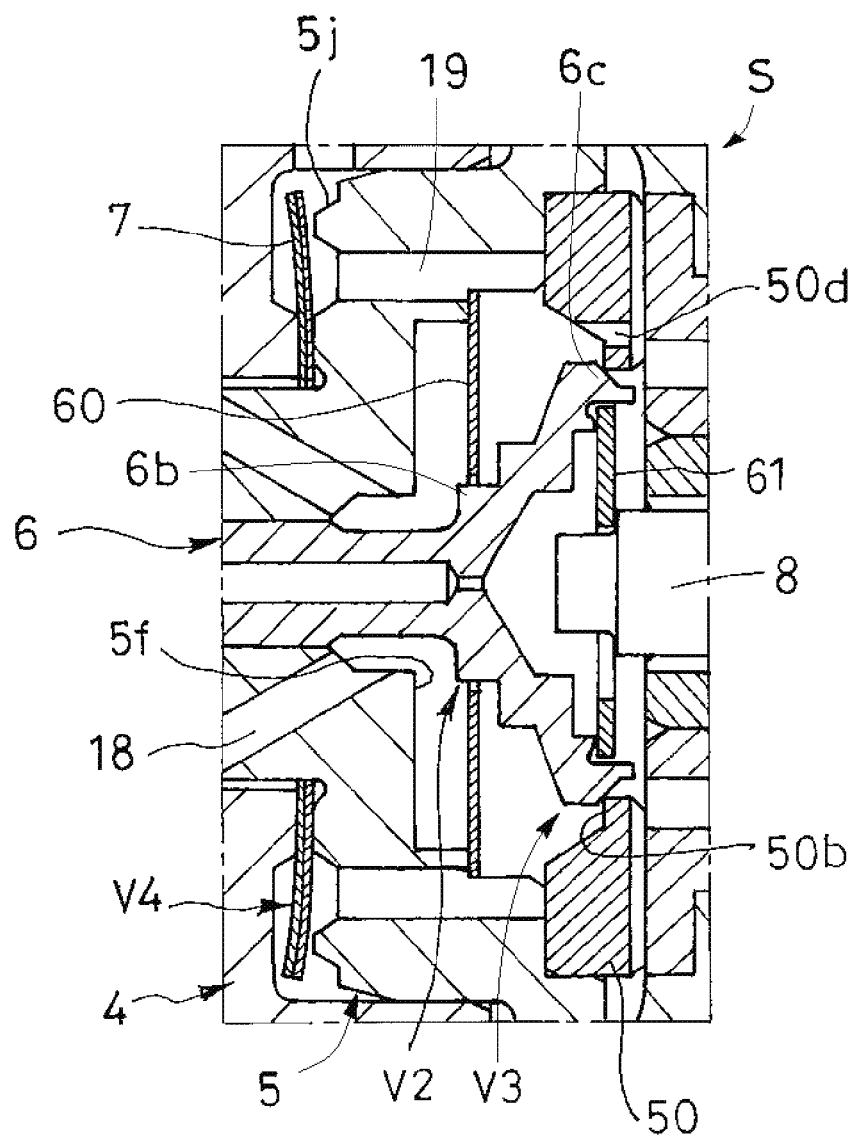
FIG. 8B is a partially enlarged vertical cross-sectional view illustrating a state where the valve element member is seated on an open/close valve seat and a fail valve is open during the fail.
Figure 9:
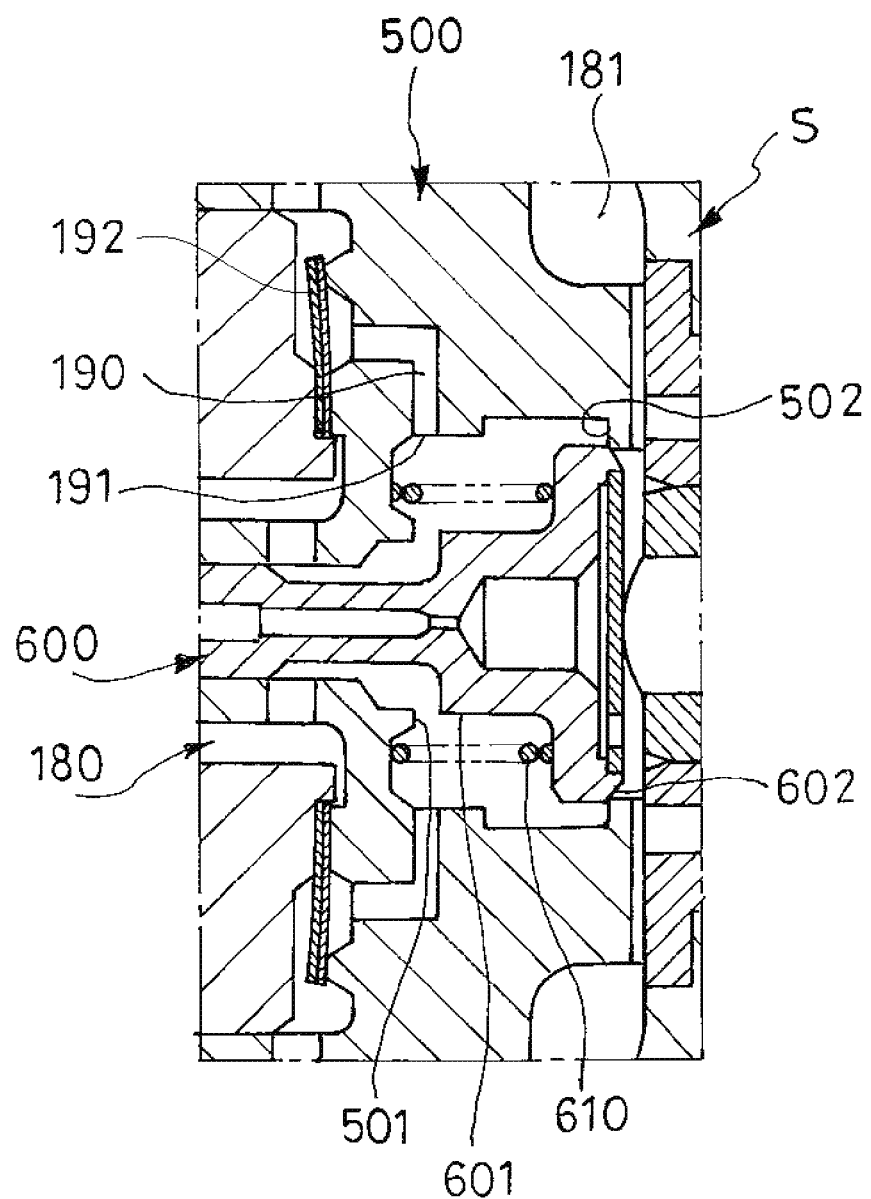
FIG. 9 is an enlarged view illustrating a part of a conventional damping valve.

In contrast to this, when the piston speed increases and the flow rate of the fluid flowing through the pilot passage 18 increases, the pressure on the upstream side with respect to the open/close valve V3 increases in the pilot passage 18. Then, the valve element member 6 retreats receiving this pressure, and the open/close valve element 6$c$ is seated on the open/close valve seat 50$b$. Thus with the open/close valve V3 closing the pilot passage 18, the fluid passes through the orifice 50$d$ of the second valve seat member 50 and moves to the reservoir R until the fail valve V4 opens. Then, when the pressure in the pilot passage 18 reaches the valve opening pressure of the fail valve V4, as illustrated in FIG. 8B, the outer peripheral portion of the fail valve element 7 flexes to the left in FIG. 2 and is away from the fail valve seat 5$j$. The fluid passes through the clearance formed between the fail valve element 7 and the fail valve seat 5$j$ and moves to the reservoir R.

That is, with the damping valve V, even during the fail during which the current supply to the solenoid S is cut off, the open/close valve V3 is in the open state at the extremely low piston speed, thereby ensuring maintaining the flow passage area of the flow passage communicating between the upstream side and the downstream side of the open/close valve V3 large. This ensures decreasing the damping force in the extremely low speed range during the fail. When the piston speed becomes high during the fail, the open/close valve V3 is closed and the fail valve V4 is opened, and thus the fail valve V4 serves as a resistance against to the flow of the fluid. Accordingly, the shock absorber A functions as a passive shock absorber during the fail. Additionally, appropriately configuring the size of the clearance formed between the open/close valve element 6$c$ and the open/close valve seat 50$b$ with the valve element member 6 at the neutral position, the cross-sectional area of the orifice 50$d$, and the valve opening pressure of the fail valve V4 ensures preliminary configuring any damping force characteristics of the shock absorber A during the fail.

The following describes operational advantages of the damping valve V and the shock absorber A including the damping valve V according to the embodiment.

With the embodiment, the shock absorber A includes the cylinder 1, the piston 10, which is slidably inserted into the cylinder 1 to partition the inside of the cylinder 1 into the rod-side chamber (one among the two chambers) L1 and the piston-side chamber (the other among the two chambers) L2, and the damping valve V. The damping valve V provides the resistance to the flow of the fluid pushed out from the rod-side chamber (the one chamber) L1 by the piston 10 during the sliding of the piston 10. The shock absorber A including the above-described damping valve V prevents the pressure control valve V2 from being closed during the full-soft control and provides the initial clearance between the pressure control valve seat 5$f$ and the pressure control valve element 6$b$; therefore, the damping force in the very low speed range during the full-soft control can be decreased. Since the open/close valve V3 is not closed during the full-soft control like during the fail, the shock absorber A can provide the desired damping force. Accordingly, the shock absorber A can improve the ride comfort of the vehicle. It should be noted that the configuration of the shock absorber A is not limited to the illustrated ones but may be appropriately changed. The above-described damping valve V may be used for a shock absorber other than the shock absorber A mounted to the vehicle.

In this embodiment, the damping valve V includes the ports 2$e$ and the main valve V1 to open and close the ports 2$e$. The pilot passage 18 guides the pressure of the ports 2$e$ on the upstream side with respect to the main valve V1 as the back-pressure of the main valve V1. This back-pressure changes according to the degree of opening and closing of the pressure control valve element 6b. That is, adjusting the degree of opening and closing of the pressure control valve element 6b ensures controlling the magnitude of the back-pressure. The degree of opening and closing means the degree of ease of opening including the preliminary open state of the pressure control valve V2 such as the valve opening pressure of the pressure control valve V2 and the initial clearance. The configuration ensures setting the valve opening pressure of the main valve V1 using the pressure on the upstream side of the ports 2e. Furthermore, the configuration adjusts the valve opening pressure of the main valve V1 by controlling the back-pressure of the main valve V1, that is, the internal pressure of the back-pressure chamber P. Thus adjusting the magnitude of the back-pressure of the main valve V1 as targeted independent of the flow rate flowing through the pilot passage 18 ensures the small variation in the damping force.

It should be noted that, the orifice 2f is disposed in the middle of the pilot passage 18 and the pressure on the upstream side of the ports 2e is depressurized and introduced to the back-pressure chamber P. However, the configuration to depressurize the pressure on the upstream side of the ports 2e and guide the pressure to the back-pressure chamber P is not limited to the orifice 2f but may be another valve such as a chalk. Since the main valve V1 includes the main valve element 3 and the auxiliary valve element 30 and has the configuration to open the ports 2e in two stages. This ensures decreasing the damping force during the full-soft control and increasing a variable width of the damping force. The configuration of the main valve V1 is not limited to this and may be changed appropriately. The present invention may be applied to a flow passage other than the pilot passage 18.

In this embodiment, the solenoid S includes the shaft 8 with the small-diameter portion 8a at the distal end portion, and the valve element member 6 has the socket 6d at the end portion. Furthermore, the damping valve V with the configuration includes the disc spring 61 (the second elastic member) whose inner periptery (one end) is fitted to the outer periphery of the small-diameter portion 8a and the outer periphery (the other end) is fitted to the inner periptery of the socket 6d. In view of this, even if the valve element member 6 receives neither the biasing force from the disc spring 60 (the elastic member) nor the thrust from the solenoid S, this configuration ensures preventing the disc spring 61 from coming off from the valve element member 6.

It should be noted that, while in this embodiment, the second elastic member is the disc spring 61 and includes the outer peripheral annular portion 61a and the tongue portions 61b, this should not be construed in a limiting sense. The second elastic member may be a disc spring other than the disc spring 61. The second elastic member may be a spring other than the disc spring (for example, a coil spring) or a rubber. The configuration to prevent from coming off of the second elastic member is not limited to the socket 6d and the small-diameter portion 8a and can be appropriately changed. For example, the disc spring 61 with the shape can be separated from both the stepped part 6i of the socket 6d and the stepped part 8b of the shaft 8 and therefore is excellent in an assembling property. However, the second elastic member may be locked to one of the valve element member 6 and the shaft 8, and the one of the valve element member 6 and the shaft 8 may be moved integrally with the second elastic member. Such change is possible even in the case where the present invention is applied to a flow passage other than the pilot passage 18.

In this embodiment, the damping valve V includes the fail passage 19 having the one end opening to between the pressure control valve seat 5f and the open/close valve seat 50b and branching from the pilot passage 18 (the flow passage) and the fail valve V4 disposed at the fail passage 19. In view of this, if the current supply to the solenoid S is cut off, the shock absorber A can function as the passive shock absorber. Furthermore, with the damping valve V with the configuration, if the current supply to the solenoid S is cut off, even if the disc spring 60 presses back the valve element member 6 to the open/close valve seat 50b side, the open/close valve element 6c is not seated on the open/close valve seat 50b by the biasing force from the disc spring 60 and the valve element member 6 is retreatable without the elastic deformation of the disc spring 60. Accordingly, in the very low speed range during the fail, the fluid can pass through between the open/close valve element 6c and the open/close valve seat 50b, thus ensuring decreasing the damping force. When the shock absorber A is mounted to the vehicle, depending on the control of the vehicle, a control so as not to flow the current to the shock absorber A at the low vehicle speed is performed in some cases. In such case as well, the damping force in the very low speed range during the non-current application can be decreased to improve the ride comfort of the vehicle.

It should be noted that, while in this embodiment, the fail valve V4 includes the fail valve element 7 as the laminated leaf valve, the configuration of the fail valve V4 is not limited to this.

In this embodiment, the damping valve V includes the valve element member 6, which includes the pressure control valve element 6b and the open/close valve element 6c, the disc spring 60 (the elastic member), and the solenoid S. The pressure control valve element 6b is seated on and liftable from the pressure control valve seat 5f to open and close the pilot passage 18 (the flow passage). The open/close valve element 6c is seated on and liftable from the open/close valve seat 50b to open and close the downstream side with respect to the part opened and closed by the pressure control valve element 6b in the pilot passage 18. The disc spring 60 is interposed between the stepped part 5g (the spring receiver) and the valve element member 6 to bias the valve element member 6 in the direction in which the pressure control valve element 6b separates from the pressure control valve seat 5f and in which the open/close valve element 6c approaches the open/close valve seat 50b. The solenoid S is configured to drive the valve element member 6 in the direction of the pressure control valve element 6b approaching the pressure control valve seat 5f against the biasing force from the disc spring 60. In a state in which the disc spring 60 has the natural length, the clearance is formed between the open/close valve element 6c and the open/close valve seat 50b.

With the configuration, the solenoid S, the pressure control valve element 6b, and the disc spring 60 constitute the pressure control valve V2. Adjusting the amount of current supplied to the solenoid S can adjust the initial clearance and the valve opening pressure (the degree of opening and closing) of the pressure control valve V2. The open/close valve V3 is configured by the open/close valve element 6c and the disc spring 60, and the open/close valve V3 opens and closes the downstream side of the pressure control valve V2 in the pilot passage 18. Furthermore, the pressure control valve element 6b as the valve element of the pressure control valve V2 and the open/close valve element 6c as the valve element of the open/close valve V3 are integrated as the valve element member 6, and the pressure control valve V2 and the open/close valve V3 share the disc spring 60. In view of this, even when the pressure control valve V2 and the open/close valve V3 are disposed in series in the pilot passage 18, the number of components can be reduced and the configuration of the damping valve V can be simplified.

Furthermore, with the configuration, while the open/close valve element 6c is seated on the open/close valve seat 50b, that is, the open/close valve V3 is closed, the biasing force from the disc spring 60 does not act on the open/close valve element 6c and the open/close valve element 6c is retreatable without the elastic deformation of the disc spring 60. Accordingly, taking the variation in each product into consideration, even when the spring constant of the disc spring 60 is increased such that the pressure control valve V2 is maintained to be open during the full-soft control, the biasing force from the disc spring 60 does not involve in the closing of the open/close valve V3; therefore, the obstruction of the pilot passage 18 by the open/close valve element 6c can be prevented.

That is, with the damping valve V with the configuration, even in the case where the valve element member 6 including the pressure control valve element 6b and the open/close valve element 6c are provided, the pressure control valve element 6b not cutting off the pilot passage 18 during the full-soft control and the open/close valve element 6c not cutting off the pilot passage 18 during the full-soft control can be achieved simultaneously. The reduction in the spring constant of the disc spring 60 does not cause a problem at all; therefore, the configuration allows improving a freedom of design of the disc spring 60.

It should be noted that, while in the embodiment, the elastic member is the disc spring 60 and includes the outer peripheral annular portion 60a and the tongue portions 60b, this should not be construed in a limiting sense. As long as the elastic member has the shape not cutting off the pilot passage 18, the elastic member may be a disc spring other than the disc spring 60. The elastic member may be a spring other than the disc spring (for example, a coil spring) or a rubber. Since the disc spring 60 is separable with respect to both the stepped part 6f of the valve element member 6 and the stepped part 5g of the first valve seat member 5, providing an excellent assembling property. Meanwhile, it may also be configured such that the elastic member is locked to one or both of the valve element member 6 and the spring receiver. Such change is possible without using the configuration to prevent from coming off of the elastic member. Such change is also possible when the present invention is applied to a flow passage other than the pilot passage 18 or the present invention is applied to the damping valve not including the fail valve V4.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2015-180349 filed with the Japan Patent Office on Sep. 14, 2015, the entire contents of which are incorporated into this specification by reference.

The invention claimed is:

1. A damping valve, comprising:
a valve element member including a pressure control valve element and an open/close valve element, the pressure control valve element being seated on and liftable from a pressure control valve seat to open and close a flow passage, the open/close valve element being seated on and liftable from an open/close valve seat to open and close a downstream side of the flow passage with respect to a part opened and closed by the pressure control valve element;
an elastic member interposed between a spring receiver and the valve element member, the elastic member being configured to bias the valve element member in a direction in which the pressure control valve element separates from the pressure control valve seat and in which the open/close valve element approaches the open/close valve seat; and
a solenoid configured to be capable of driving the valve element member against a biasing force by the elastic member in a direction in which the pressure control valve element approaches the pressure control valve seat, wherein
in a state in which the elastic member has a natural length and an elastic biasing force is not acting on the valve element member, a clearance is formed between the open/close valve element and the open/close valve seat in the biasing direction of the elastic member, and
the valve element member is elastically biased only by the elastic member in the direction in which the open/close valve element approaches the open/close valve seat.

2. The damping valve according to claim 1, further comprising:
a fail passage having a one end opening to between the pressure control valve seat and the open/close valve seat and to be branched from the flow passage; and
a fail valve disposed at the fail passage.

3. The damping valve according to claim 1, wherein:
the solenoid includes a shaft with a small-diameter portion at a distal end,
the valve element member includes a socket at an end portion, and
the damping valve further includes a second elastic member, the second elastic member having a one end fitted to an outer periphery of the small-diameter portion and another end fitted to an inner periptery of the socket.

4. The damping valve according to claim 1, further comprising:
a port; and
a main valve that opens and closes the port, wherein:
the flow passage is a pilot passage configured to guide a pressure of the port on an upstream side with respect to the main valve as a back-pressure of the main valve, and
the back-pressure changes according to a degree of opening and closing of the pressure control valve element.

5. A shock absorber including the damping valve according to claim 1, the shock absorber comprising:
a cylinder;
a piston slidably inserted into the cylinder to partition the inside of the cylinder into two chambers; and
the damping valve, wherein
the damping valve provides a resistance to a flow of fluid, the fluid being pushed out from the one chamber by the piston during the sliding of the piston.

6. A damping valve, comprising:
a valve element member including a pressure control valve element and an open/close valve element, the pressure control valve element being seated on and liftable from a pressure control valve seat to open and close a flow passage, the open/close valve element being seated on and liftable from an open/close valve seat to open and close a downstream side of the flow passage with respect to a part opened and closed by the pressure control valve element;

an elastic member interposed between a spring receiver and the valve element member, the elastic member being configured to bias the valve element member in a direction in which the pressure control valve element separates from the pressure control valve seat and in which the open/close valve element approaches the open/close valve seat;

a solenoid configured to be capable of driving the valve element member against a biasing force by the elastic member in a direction in which the pressure control valve element approaches the pressure control valve seat;

a fail passage having a one end opening to between the pressure control valve seat and the open/close valve seat and to be branched from the flow passage; and a fail valve disposed at the fail passage, wherein in a state in which the elastic member has a natural length and an elastic biasing force is not acting on the valve element member, a clearance is formed between the open/close valve element and the open/close valve seat in the biasing direction of the elastic member.

7. A damping valve, comprising:

a valve element member including a pressure control valve element and an open/close valve element, the pressure control valve element being seated on and liftable from a pressure control valve seat to open and close a flow passage, the open/close valve element being seated on and liftable from an open/close valve seat to open and close a downstream side of the flow passage with respect to a part opened and closed by the pressure control valve element;

an elastic member interposed between a spring receiver and the valve element member, the elastic member being configured to bias the valve element member in a direction in which the pressure control valve element separates from the pressure control valve seat and in which the open/close valve element approaches the open/close valve seat;

a solenoid configured to be capable of driving the valve element member against a biasing force by the elastic member in a direction in which the pressure control valve element approaches the pressure control valve seat, wherein in a state in which the elastic member has a natural length, a clearance is formed between the open/close valve element and the open/close valve seat, the solenoid includes a shaft with a small-diameter portion at a distal end, the valve element member includes a socket at an end portion, and the damping valve further includes a second elastic member, the second elastic member having a one end fitted to an outer periphery of the small-diameter portion and another end fitted to an inner periptery of the socket.

* * * * *